(No Model.) 3 Sheets—Sheet 3.
J. W. COMLEY.
METHOD OF AND APPARATUS FOR WELDING METALS.
No. 593,534. Patented Nov. 9, 1897.
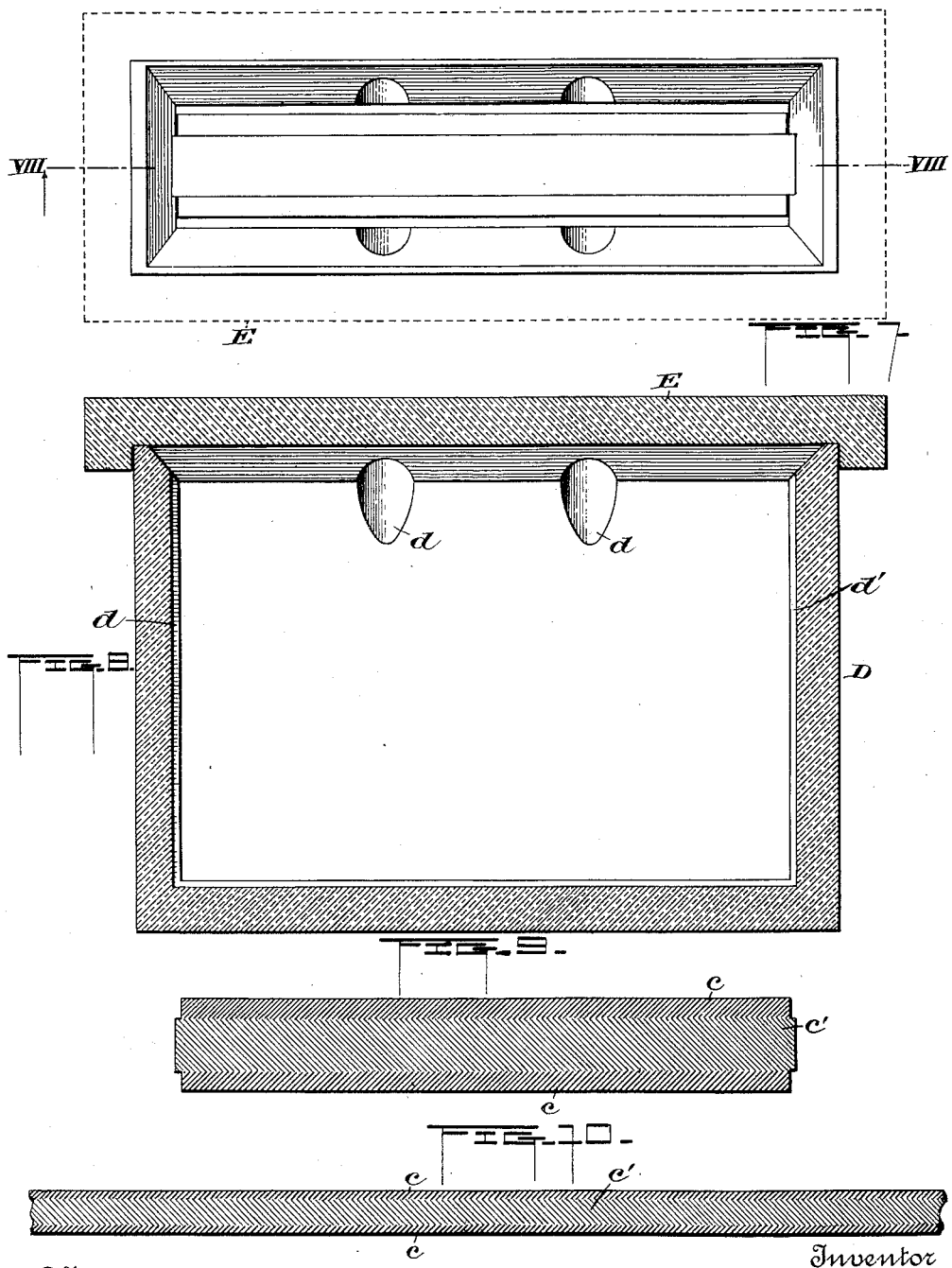

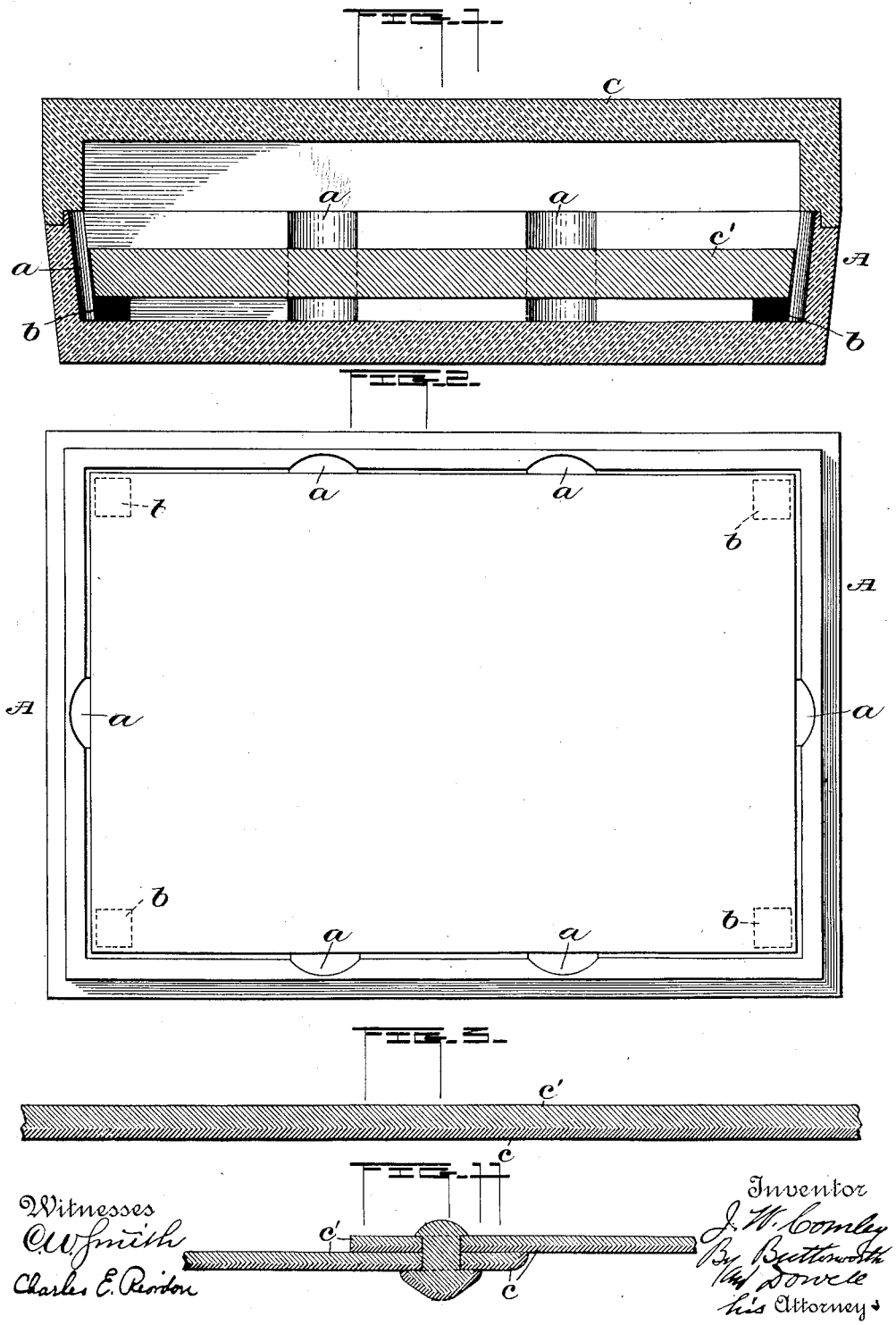

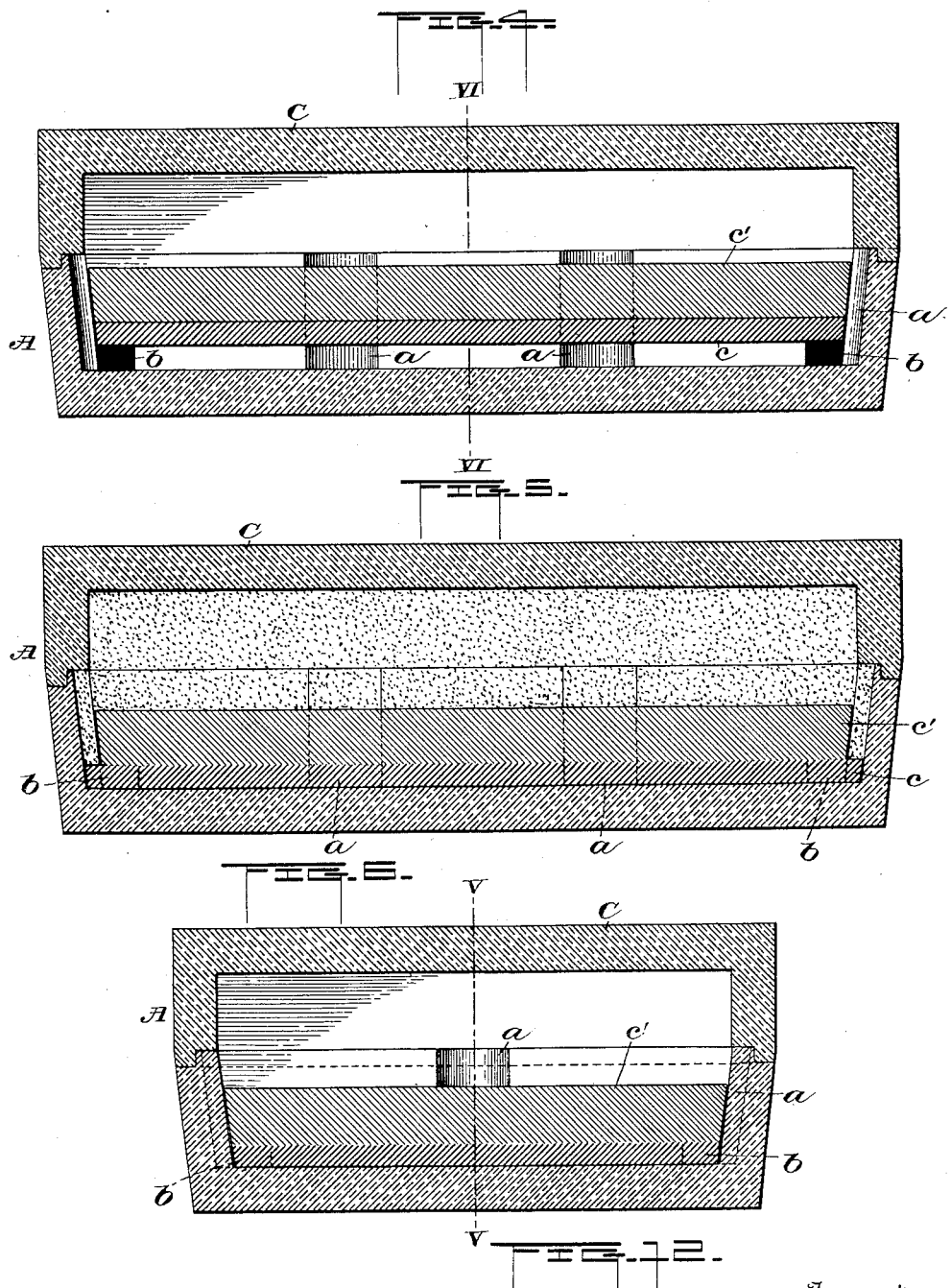

UNITED STATES PATENT OFFICE.

JOSEPH WILLIAM COMLEY, OF BRADDOCK, PENNSYLVANIA, ASSIGNOR OF ELEVEN-TWENTIETHS TO JAMES SHIREY BEDELL, WILLIAM SMITH FRYE, JAMES PAYNE BEAM, AND WILLIAM WILBUR PAYNE, OF JEFFERSON, LEON JAMES LONG AND JOHN C. WERNER, OF PITTSBURG, AND ARCH. HAMILTON ROWAND, JR., OF VERONA, PENNSYLVANIA.

METHOD OF AND APPARATUS FOR WELDING METALS.

SPECIFICATION forming part of Letters Patent No. 593,534, dated November 9, 1897.

Application filed April 7, 1896. Serial No. 586,576. (No model.)

*To all whom it may concern:*

Be it known that I, JOSEPH WILLIAM COMLEY, a citizen of the United States, residing at Braddock, in the county of Allegheny and State of Pennsylvania, have invented certain new and useful Improvements in Methods of and Apparatus for Welding Metals; and I do hereby declare the following to be a full, clear, and exact description of the invention, such as will enable others skilled in the art to which it appertains to make and use the same.

This invention relates to welding metals, but more particularly to welding two metals of different density and fusibility, such as copper and iron or copper and steel.

The primary object of my invention is to unite different metals, as copper and iron and copper and steel, into two or more alternate layers in such a manner that their abutting surfaces may be welded so as to provide a perfect homogeneous union, so that the composite block, sheet, or other body may be hammered, rolled, or otherwise worked into different forms without the liability of the metals separating by reason of an imperfect union and oxidation or from other causes.

Another object is to provide a method of treatment by which copper and iron or copper and steel in the shape of sheets, plates, bars, bolts, &c., may be welded together, so as to form a homogeneous union of the two metals and the copper purified by eliminating the impurities during the process of welding.

A further object is to provide a simple, efficient, and inexpensive apparatus or device by which the metal in the various stages of the process may be under complete control and whereby the copper or fusible metal may be agitated during the process of welding, so that the impurities may be driven off or removed therefrom.

The invention will first be hereinafter more particularly described with reference to the accompanying drawings, forming a part of this specification, and then pointed out in the claims at the end of the description.

In the drawings, Figure 1 is a vertical longitudinal section of a crucible, illustrating an iron or steel plate in position for welding. Fig. 2 is a plan view of the crucible with the lid or cover removed, showing the ports or vents for agitating or "teasing" the copper. Fig. 3 is a sectional view of the composite plate after being passed between rollers or otherwise reduced in thickness. Fig. 4 is a vertical longitudinal section of a crucible similar to that shown in Fig. 1, illustrating how two independent plates may be welded together. Fig. 5 is a vertical longitudinal section of the last-mentioned crucible, taken on the line V V of Fig. 6, the plates being welded and the crucible filled with a suitable substance, so as to permit the metals to cool gradually and prevent chilling. Fig. 6 is a vertical transverse section, taken on the line VI VI of Fig. 4, after the metals have been welded. Fig. 7 is a plan view of a modified form of crucible which may be employed when it is desired to provide a plate of iron or steel having a plate or coating of copper on its opposite sides. Fig. 8 is a vertical sectional view taken on the line VIII VIII of Fig. 7 before the insertion of the plate or plates to be welded. Fig. 9 is a sectional plan view of the composite plate after its removal from the crucible. Fig. 10 is a sectional view of the composite plate after being passed through rollers or otherwise reduced in thickness. Fig. 11 is a sectional view of two plates riveted together, illustrating how the copper may be welded to the plates and rivets, so as to prevent corrosion of their surfaces when used in boiler construction and for ship-building purposes; and Fig. 12 is a sectional view of a butt-welded rod, which may be used to fasten the ship-plates to the armor-plates of vessels.

Heretofore it has been proposed to plunge the iron or steel into the molten copper and then chill, roll, or hammer the combined metals, or to fix the plates one upon the other and then raise their temperature to a high degree of heat and while in such condition roll or hammer them, so as to unite their abutting surfaces. It has also been proposed to cast upon or around an iron or steel core a covering of copper or other ductile metal and then roll the combined ingot into flat form by rolls or otherwise; but such processes and others which have been heretofore proposed, while serving in a measure to unite the metals, fail to give satisfactory results in practice for welding purposes owing to the fact that the union is not a perfect homogeneous one, although the iron or steel may have been perfectly freed from scale or rust prior to welding.

As a metal worker for the last twenty years I have personally conducted many experiments in welding metals, including such as those above mentioned and others having in view the successful welding of copper and iron or copper and steel, and as a result of such experiments I have discovered a method of treating the metals which I will now proceed to describe and whereby I have overcome the objectionable features of previous methods and by means of which two or more different metals may be homogeneously united at their abutting surfaces, so that the composite mass, block, or sheet of metal may be hammered, rolled, or otherwise worked into different forms.

In carrying the invention into effect it is essential that the iron or steel before welding the copper thereto should be thoroughly freed from scale or rust for the reason that this class of oxids is very injurious to the process of welding the metals and will prevent a perfect union. Any suitable means may be employed for cleaning the surface of the metal and any suitable means may be employed for holding the metal bar or bars, sheet or sheets during the process of welding. When a single sheet or body of copper is to be welded to a sheet or body of iron or steel, I preferably employ a black-lead crucible of any desired shape. I have illustrated in Figs. 1 to 6 a preferred form, in which the body A of the crucible is rectangular and provided with slightly-sloping sides, so as to permit the ready insertion or removal of the plates, and has, preferably, a series of vertically-arranged ports or vents $a$, arranged along the sloping sides thereof and which extend from the upper edges of the sides and ends to the bottom thereof, said body being provided with carbon or other refractory blocks or rests $b$, located in the lower portion of each corner and adapted to support the plate or sheet of iron or steel $c'$ resting thereon, as shown in Fig. 1, above the bottom of the crucible in order to provide a space beneath said plate corresponding to the thickness of copper desired. The space beneath the plate $c'$ may now be filled with molten or fused copper through one or more of the vents or ports $a$, and the cover or lid C being then placed upon the body A and held in position in any suitable manner the crucible, with its contents, is placed in a suitable furnace, and the heat is raised preferably gradually to a high degree, varying from 2,600° to 2,800° Fahrenheit, according to the metals used. In all cases the heat should be raised above the fusing-point of one metal and below the fusing-point of the other. Where wrought-iron or steel is used, a temperature of from 2,600° to 2,800° Fahrenheit is employed, and for cast-iron about 2,600° Fahrenheit, the heat being preferably maintained for fifteen or twenty minutes, or until all the impurities have been thoroughly worked out of the molten copper. This very desirable result of purifying the copper is obtained or assisted by removing the lid or cover and using a puddling-rod to agitate or tease the copper through the vents or port-holes $a$, so as to effect the elimination of the sulfurous-acid gas from the copper, as well as to bring or force the oxids to the port-holes, from which they may be gathered upon the puddling-rod and removed. After the scum ceases to form I may take a piece of green wood if convenient or a piece of hard wood and thrust it into the molten copper, causing thereby a violent ebullition or agitation which further frees the copper of its sulfurous-acid gas. The port-holes are then carefully examined to determine if there is sufficient molten copper in the crucible to form the desired thickness, and if not sufficient scrap or other copper may be added to make up for the deficiency. The crucible, if in an open fire or furnace, is now filled with a suitable substance to prevent too rapid cooling or chilling, equal parts of powdered charcoal and sand or brick-dust being preferably used for this purpose, so as to entirely cover the plates and fill the port-holes, whereupon the crucible with its contents is carefully removed from the furnace, but if the crucible is placed in a closed furnace the charcoal and sand are to be added immediately after the crucible is removed from the furnace and while the copper is still in a molten state. As soon as the copper is solidified the welded plate may be removed from the crucible, and for greater economy in manufacture may be at once rolled or otherwise worked or may be stacked one upon another, preferably with the iron uppermost, so as to prevent buckling while cooling.

In welding copper and cast-iron the process should be carefully guarded, otherwise the metals might amalgamate, and where high carbon steels are manipulated the process should receive very careful attention.

Instead of charging the crucible with a plate of iron or steel and molten copper, as thus far described, I may place a plate or body of copper $c$ upon the supports $b$ and arrange upon the copper the sheet or body of steel or iron $c'$ to be welded thereto, as shown in Fig. 4. In this case the crucible is first covered and then placed in a furnace, so as to fuse the copper and permit the iron or steel plate to drop and rest upon the supports or blocks $b$, after which the metals are raised to a high degree of heat, say 2,800° Fahrenheit, for copper and steel, and treated in the manner hereinbefore described.

When the iron or steel is to be plated or welded on both sides with copper, I may employ a crucible such as is shown in Figs. 9 and 10. In this case the body D of the crucible has the vents or ports $d$ in its sides and grooves $d'$ in its ends, said grooves being, preferably, centrally arranged and adapted to be engaged by the ends of the iron or steel plate, as shown in Fig. 5, so that said plate may be properly alined endwise and held so as to provide a space on opposite sides thereof equal to the thickness of the copper desired. It is preferable first to warm the crucible, and after charging it with a plate previously freed from rust and scale the molten copper is poured into the crucible through the vents in the sides or otherwise, so as to fill the spaces on opposite sides of the plate. The crucible may now be covered with the lid E and placed in the furnace, when the heat may be raised to 2,600° or 2,800° Fahrenheit, according to the metals treated, and the process carried out in all essential particulars in the manner heretofore explained. I thus provide a perfect homogeneous weld or union of the different metals, so as to effectually prevent their separation by oxidation, rolling, hammering, or otherwise working the same and provide means whereby the copper may be purified during the welding process.

Instead of providing crucibles constructed as shown it may be desirable in some instances, particularly for the manufacture of heavy plates or to weld large quantities of copper to iron or steel, to construct a crucible of fire-brick, lined with black-lead or other suitable mixture, which must be thoroughly dried and baked.

The welding of other metals than copper and iron and copper and steel may be carried out by my process, and some of the steps of the process might be varied or dispensed with without departing from the spirit of my invention.

It will be understood, of course, that the foregoing method of welding may be applied in the manufacture of composite sheets, plates, and bars of copper and iron or steel and also various mechanical appliances—such as trolleys, pulleys, rollers, bolts, rivets, hammers, and various other tools—by simply providing suitable crucibles for effecting the union of the two metals according to the nature and character of the article to be produced and the uses to which it is to be put.

Having thus fully described my invention, what I claim as new, and desire to secure by Letters Patent of the United States, is—

1. The method of welding two metals which are fusible at different temperatures, which consists in liquefying the more fusible metal and causing the less fusible metal to contact therewith, and then raising the temperature of both metals while thus in contact to a temperature considerably greater than the fusing temperature of the more fusible metal, and almost to the fusing-point of the less fusible metal, whereby a homogeneous union of the metals may be effected, substantially as described.

2. The method of welding two metals which are fusible at different temperatures, which consists in liquefying the more fusible metal and bringing the same into contact with the surface of the less fusible metal, raising the temperature of both metals while thus in contact to a temperature above the fusing-point of the more fusible metal but below the fusing-point of the less fusible, agitating the molten metal so as to drive off the impurities, and finally solidifying the molten metal while in contact with the metal to be welded thereto, whereby the molten metal may be purified and a homogeneous union secured between the metals, substantially as described.

3. The method of welding copper and iron or copper and steel, which consists in forming a liquefied layer of the desired thickness of copper in contact with the surface or surfaces of the iron or steel, then raising the temperature of both metals while thus in contact to a degree above the fusing-point of the copper and almost to the fusing-point of the iron or steel, and finally solidifying the copper while in contact with the iron or steel, whereby a homogeneous union of the metals may be secured, substantially as described.

4. The method of welding copper and iron or copper and steel, which consists in forming a liquefied layer of the desired thickness of copper in contact with the surface or surfaces of the iron or steel, then raising the temperature of both metals while thus in contact to a high degree of heat above the fusing-point of the copper, but below the fusing-point of the iron or steel, eliminating the impurities from the copper by agitating or teasing the molten metal, and finally solidifying the copper while in contact with the iron or steel, whereby a homogeneous union may be secured between the metals, substantially as described.

5. The method of welding copper and iron or copper and steel, which consists in forming a layer or layers of copper in contact with the surface or surfaces of the iron or steel, then gradually raising the temperature of both metals while thus in contact to a degree of heat considerably above the fusing-point of the copper but below the fusing-point of the iron or steel, agitating the molten copper so as to remove or drive off the impurities contained therein, and finally gradually cooling the metals so as to solidify the copper while in contact with the iron or steel, whereby the copper may be purified and a homogeneous union secured between the metals, substantially as described.

6. The method of welding copper and iron or copper and steel, substantially as hereinbefore described, which consists in producing a layer or layers of molten copper in contact with the previously-cleaned surface or surfaces of the iron or steel, then raising the temperature of the metals to the boiling-point of the copper and approximating the fusing-point of the iron or steel, agitating the molten copper to eliminate impurities, then covering the metals thus treated while still highly heated with a heat-retaining medium and permitting the metals to gradually cool, substantially as described.

7. A crucible for welding copper and iron or copper and steel, comprising a body portion provided with vents or port-holes therein, means for supporting an iron or steel plate so as to provide a space for the copper between the inner surface of said body portion and the surface of the plate, and a lid adapted to fit over the body portion and inclose the metals within the same, substantially as described.

8. A crucible for welding copper and iron and copper and steel, comprising a body portion provided with vents or port-holes in the sides thereof, non-fusible means for supporting the iron or steel plate above the bottom of the body portion so as to provide a space for the copper, and a lid for inclosing the plate within said body portion, substantially as described.

In testimony whereof I affix my signature in presence of two witnesses.

JOSEPH WILLIAM COMLEY.

Witnesses:
DAVID HARDY,
B. J. DEVLIN.